United States Patent [19]

Vary

[11] 3,992,347

[45] Nov. 16, 1976

[54] ARLOXYSULFONE COPOLYMER SOLUTION HAVING PERFLUORO-CARBON POLYMER PARTICLES DISPERSED THEREIN

[75] Inventor: Eva M. Vary, Wynnewood, Pa.

[73] Assignee: E. I. Du Pont de Nemours & Co., Wilmington, Del.

[22] Filed: Sept. 11, 1975

[21] Appl. No.: 612,550

Related U.S. Application Data

[63] Continuation of Ser. No. 375,049, June 29, 1973, abandoned.

[52] U.S. Cl. .................... 260/30.2; 260/29.1 R; 260/30.4 SB; 260/30.4 R; 260/32.6 R; 260/32.8 SB; 260/32.8 R; 260/33.6 SB; 260/33.6 F; 260/33.8 SB; 260/33.8 F; 260/827; 260/900;

[51] Int. Cl.$^2$ ................... C08K 5/01; C08K 5/02; C08K 5/15; C08K 5/34

[58] Field of Search ................ 260/33.4 F, 33.4 SB, 260/33.6 F, 33.8 F, 33.6 SB, 33.8 SB, 32.8 SB, 30.2, 30.4, 32.8 R, 32.6 R, 29.1 R

[56] References Cited

UNITED STATES PATENTS

| | | | |
|---|---|---|---|
| 2,844,557 | 7/1958 | Welch | 260/33.6 F |
| 3,321,449 | 5/1967 | Vogel | 260/79.3 |
| 3,592,790 | 7/1971 | Flanner et al. | 260/33.6 SB |
| 3,661,831 | 5/1972 | Fang | 260/33.4 F |

FOREIGN PATENTS OR APPLICATIONS 1,122,192  7/1968  United Kingdom ............... 260/79.3

*Primary Examiner*—Allan Lieberman

[57] ABSTRACT

The novel coating composition contains a uniformly dispersed perfluorocarbon polymer in an organic solvent solution of an aryloxysulfone copolymer; finishes of the novel composition have excellent grease and stain resistance, good thermal stability, toughness and durability and good release properties and are useful as release finishes for bakeware and cookware and can be used as coatings for appliances and industrial equipment.

4 Claims, No Drawings

3,992,347

ARLOXYSULFONE COPOLYMER SOLUTION HAVING PERFLUORO-CARBON POLYMER PARTICLES DISPERSED THEREIN

CROSS-REFERENCE TO RELATED CASES

This is a continuation of copending application Ser. No. 375,049, filed June 29, 1973, now abandoned.

BACKGROUND OF THE INVENTION

This invention relates to a coating composition and in particular to a coating composition of an aryloxysulfone copolymer.

Home and industrial bakeware and cookware require finishes that have good food release properties, thermal stability and are durable. Also, the exterior areas of cookware such as fry pans, covers for fry pans, the sides and bottoms of electric cooking appliances require finishes that are tough, durable, thermally stable, and have release properties. Finishes of fluorocarbon polymers have been used and form high quality release coatings but the durability of these finishes could be improved. Polysulfone resins are tough and durable and are well known in the art as shown by Vogel U.S. Pat. No. 3,321,449, issued May 23, 1967; D'Alessandro U.S. Pat. No. 3,355,272, issued Nov. 28, 1967; Cohen et al. U.S. Pat. No. 3,518,272, issued June 30, 1970; Pietrusze et al. U.S. Pat. No. 3,536,665, issued Oct. 27, 1970 and British Pat. No. 1,122,192, published July 31, 1968. However, it has not been possible to Dispersions of high quality release coatings from these resins. Dispersionsof polyarylsulfones and fluorinated polyphenylene oxide polymers are shown in Whittemore et al. U.S. Pat. No. 3,471,587, issued Oct. 7, 1969 but these dispersions do not form the high quality finishes that are required for many uses.

The novel coating composition of this invention has excellent adhesion to all types of substrates and is tough, durable and thermally stable and has excellent release properties.

SUMMARY OF THE INVENTION

The coating composition of this invention comprises 5-60% by weight of a binder of an aryloxysulfone copolymer dissolved in a solvent and a uniformly dispersed perfluorocarbon polymer and correspondingly, 40-95% by weight of a solvent for the copolymer wherein the binder consists essentially of 1. 2-98% by weight, based on the weight of the binder, of an aryloxysulfone copolymer of the formula

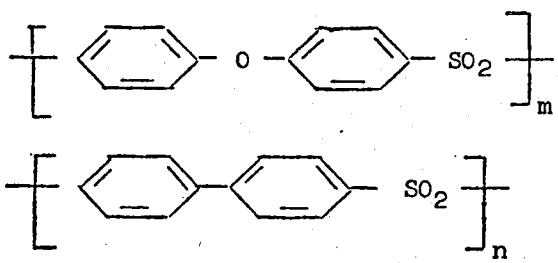

where m and n are positive integers from 15 to 2,500;
2. 98-2% by weight, based on the weight of the binder, of a uniformly dispersed perfluorocarbon polymer, preferably polytetrafluoroethylene or a copolymer of tetrafluoroethylene and hexafluoropropylene.

DESCRIPTION OF THE INVENTION

The dispersion of this invention preferably contains about 20-55% by weight of the film-forming binder. The dispersion can contain pigments which are uniformly dispersed therein in a pigment to binder weight ratio of about 1:100 to about 200:100.

The aryloxysulfone copolymer used in the novel coating composition of this invention has repeating units of the formula

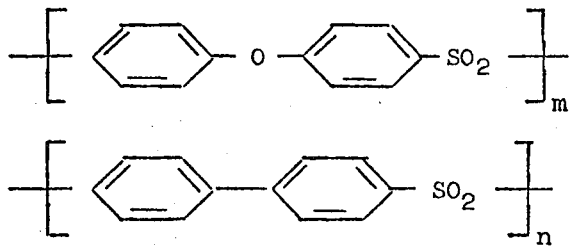

where m and n are positive integers and m and n are positive integers from 14 to 2,500, and preferably the ratio of n to m is from about 4:6 to 3:7. This copolymer can be prepared according to British Pat. No. 1,122,192.

Another preferred aryloxysulfone copolymer having the above formula that is used in this invention has an inherent viscosity of about 0.40-0.50 measured at 25° C. using 0.5% polymer solids in N-methylpyrrolidone solvent. One particularly preferred copolymer has an inherent viscosity of about 0.45-0.47 measured as indicated above.

Preferably, the binder of the novel coating composition of this invention contains 50-85% by weight of the aromatic polysulfone resin, and correspondingly, 50-15% by weight of the perfluorocarbon polymer.

The perfluorocarbon polymer preferably is polytetrafluoroethylene or a copolymer of tetrafluoroethylene and hexafluoropropylene. The copolymer has a tetrafluoroethylene to hexafluoropropylene weight ratio of about 95/5 to about 50/50. Preferably, the copolymer has a weight ratio of about 75/25 to about 85/15 of tetrafluoroethylene to hexafluoropropylene. Other perfluorocarbon polymer such as polyvinylidene fluoride can also be used.

The dispersed perfluorocarbon particles have a particle diameter of about 0.01 to about 6 microns. Preferably, the dispersions have particles in the range of 0.01-2.0 microns and form dispersions with excellent stability.

The novel coating composition of this invention is prepared by dissolving the aryloxysulfone copolymer in a solvent for the resin and then adding an organic dispersion of the perfluorocarbon polymer to the solution and thoroughly blending the constituents together to form the novel coating composition of this invention.

The organic dispersion of the perfluorocarbon polymer is prepared according to conventional techniques in which the polymer is dispersed in an organic liquid by ball milling, or pebble milling 12-100 hours. Typical organic liquids that can be used are toluene, xylene, N-methyl pyrrolidone, ketones such as methyl isobutyl ketone and the like.

The following are typical solvents that are useful in preparing the solution of the aryloxysulfone copolymer and in diluting the novel composition to an application viscosity: methylene chloride, trichloroethylene, monochlorobenzene, cyclohexanone, chloroform, chlorobenzene, tetrachloroethylene, 1,1,2,2-tetrachloroethane, xylene, tetrahydrofuran, N-methyl pyrrolidone, dimethyl formamide, dimethyl acetamide, a blend of acetone/toluene or a blend of toluene and a chlorinated solvent such as methylene chloride or chloroform.

Pigments in the above pigment to binder ratio can be blended with the coating composition and then ground by conventional techniques, such as pebble milling or ball milling to uniformly disperse the pigment in the composition. Preferably, the pigment is formed into a mill base by grinding the pigment with the solution of the polysulfone resin. The mill base is then blended with the novel coating composition.

The following are examples of the great variety of pigments which can be used in the novel coating composition of this invention: metallic oxides, preferably titanium dioxide, zinc oxide, and the like, metal hydroxides, metal flakes, such as aluminum flake, metal powders, sulfides, sulfate, carbonates, carbon black, silica, silicates, hydrophobic silicates, such as silicone treated with silicone dioxide, talc, china clay, iron oxide, iron blues, organic reds, maroons and other organic dyes and lakes. For high temperature use, a temperature resistant pigment, such as carbon black or red iron oxide are used.

Up to about 10% by weight, and preferably 2 to 10% by weight solids, based on the weight of the binder, of a silicone resin can be added to the novel coating composition. These silicone resins have the formula

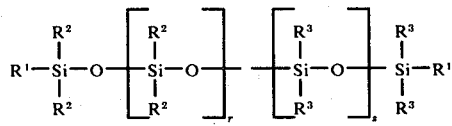

where $R^2$ and $R^3$ are monovalent radicals of hydrogen, an alkyl group having 1–8 carbon atoms such as methyl, ethyl, propyl, isopropyl, butyl, isobutyl, pentyl, hexyl, 2-ethylhexyl or octyl or an aryl group such as phenyl, biphenyl, tolyl, xylyl, naphthyl; $R^1$ is any of the above monovalent radicals including a hydroxyl radical; $r$ and $s$ are positive integers from 0–3000 and are sufficiently large to provide a film-forming resin. Preferably, $r$ and $s$ are from about 20–400. Typical silicone resins are a blend of dimethyl polysiloxane and diphenyl polysiloxane, dimethyl polysiloxane, dimethyl diphenyl polysiloxane, hydroxy terminated dimethyl diphenyl siloxane and the like. Dimethyl diphenyl polysiloxane is a preferred resin since it forms a high quality finish.

One preferred composition contains 33 to 43% by weight of the aryloxy polysulfone resin, 52 to 62% by weight of the perfluorocarbon resin and 4 to 6% by weight of the silicone resin.

The coating composition of this invention can be applied to a variety of substrates, for example, metal, glass or plastics by any of the usual application methods, such as spraying, electrostatic spraying, dipping, brushing, flow coating, roller coating, reverse roller coating and the like. These coatings are baked at about 150°–425° C. for about 5 minutes to 2 hours. The resulting coating is about 0.1–10 mils thick and preferably, 0.5–5 mils thick.

The novel composition can be used as a primer coating about 0.1–10 mils in thickness and also as a topcoating which can be about 0.5–50 mils thick.

The novel coating composition of this invention provides finishes that have excellent release properties, good water and stain resistance and excellent thermal resistance making the finishes particularly suitable for bakeware, such as muffin pans, bread pans, cookie sheets and other commonly used household cooking vessels. Preferably, an aluminum substrate is used which may be treated, primed or roughened before the finish is applied and baked. Iron, steel and steel alloys can also be used.

The coating composition has excellent adhesion to bare or treated metals such as aluminum or steel or to metals which have been previously primed or painted with alkyd, epoxy or acrylic enamels. Also, the coating composition can be a highly pigmented coating or can be used as a clear coating.

Finishes of the novel composition have particularly excellent physical properties as stated above including excellent adhesion to primed and unprimed metal substrates, toughness, hardness and crack resistance. The composition is not only useful for coating vessels as stated above, but can be used as a coating for range parts, plumbing fixtures such as sinks, and as a clear coating for hardware items, such as saws, chisels, planes, knives and the like. Also, the coating composition can be utilized as a primary finish for refrigerators, stoves, washers, dryers and the like.

The coating composition can also be used as an adhesive for metals, glass and plastics and can be used to form laminates. Also, the novel composition can be used to impregnate woven and non-woven webs of natural and synthetic fibers to form high quality compositions.

The following Examples illustrate this invention. The parts and percentages are by weight unless otherwise specified.

EXAMPLE 1

A primer composition is prepared as follows:

| | Parts By Weight |
|---|---|
| Portion 1 | |
| Aryloxysulfone copolymer (having the formula 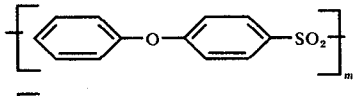 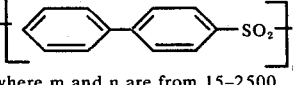 where m and n are from 15–2500 and the copolymer has an inherent viscosity[(1)] of about 0.46) | 33 |
| N-methyl pyrrolidone | 170 |
| Portion 2 | |
| ULTROX 1000 W (zirconium silicate pigment) | 50 |
| Red Iron oxide pigment | 2 |
| Portion 3 | |
| Polytetrafluoroethylene dispersion (33% polymer solids in N- | |

| | Parts By Weight |
|---|---|
| methyl pyrrolidone and toluene) | 52 |
| Total | 307 |

(1)Inherent viscosity is determined at 25° C. using 0.5% polymer solids dissolved in N-methyl pyrrolidone.

Portion 1 is charged into a mixing vessel and mixed until a solution is formed. This solution is charged into a pebble mill along with Portion 2 and the constituents are milled for about 10 hours giving a uniform dispersion. Portion 3 is then thoroughly blended into the dispersion and the dispersion is filtered.

The dispersion is sprayed onto an aluminum substrate and onto an aluminum fry pan and prebaked for 10 minutes at 250° C. and then baked for 20 minutes at 390° C. The resulting finish has excellent adhesion to the metal substrate.

A topcoating composition is prepared as follows:

| | Parts By Weight |
|---|---|
| Portion 1 | |
| Aryloxysulfone copolymer (described above) | 15.0 |
| N-methyl pyrrolidone | 100.0 |
| Portion 2 | |
| ULTROX 100 W (zirconium silicate pigment) | 18.0 |
| Portion 3 | |
| Silicone resin — dimethyl diphenyl siloxane oil having a viscosity of about 20,000 centistokes | 0.4 |
| Portion 4 | |
| Polytetrafluoroethylene dispersion (described above) | 100.0 |
| Total | 233.4 |

Portion 1 is charged into a mixing vessel and mixed until a solution is formed. This solution is charged into a pebble mill with Portion 2 and milled for 10 hours to form a dispersion. Portion 3 is added and blended into the dispersion then Portion 4 is added and blended into the dispersion and the resulting dispersion is filtered.

The dispersion is sprayed onto the above primed aluminum panel and fry pan and dried and baked as above to provide a finish that has excellent adhesion to the substrate, is smooth and even and has excellent food release properties. The fry pan is subjected to extended cooking cycles and the finish retains its release properties and continues to have excellent intercoat adhesion and excellent adhesion to the substrate.

EXAMPLE 2

A polytetrafluoroethylene dispersion is prepared as follows:

| | Parts By Weight |
|---|---|
| Polytetrafluoroethylene powder | 33.1 |
| Polymeric fluorocarboxylic acids (molecular weight of 300–2,000) | 2.6 |
| Acrylic resin solution (40% polymer solids of a methyl methacrylate/MESO* copolymer, weight ratio 68/32 in solvent blend of toluene/acetone/methylethyl ketone) | 2.5 |
| N-methyl pyrrolidone | 41.9 |
| Toluene | 17.4 |

| | Parts By Weight |
|---|---|
| Total | 97.5 |

*MESO — 3-2-methacryloxyethyl-2,2-spirocyclohexyl oxazolidine.

The above ingredients are mixed under medium shear mixing conditions to form a uniform dispersion having a 40.7% solids content.

A topcoating composition is prepared as follows:

| | Parts By Weight |
|---|---|
| Portion 1 | |
| Aryloxysulfone copolymer (described in Example 1) | 15.0 |
| N-methyl pyrrolidone | 100.0 |
| Portion 2 | |
| ULTROX 1000 W (zirconium silicate pigment) | 25.0 |
| Pigments (please describe) | 2.0 |
| Portion 3 | |
| Silicone resin (described in Example 1) | 0.8 |
| Portion 4 | |
| Polytetrafluoroethylene dispersion (prepared above) | 100.0 |
| Total | 242.8 |

The above ingredients are ground and blended according to the procedure described in Example 1 to prepare the topcoating composition of Example 1. The resulting dispersion is then filtered. The dispersion is sprayed onto an aluminum panel and a fry pan each primed as in Example 1 with a 0.4 mil thick primer layer. The panel and pan are dried and baked as in Example 1 to form a coalesced topcoating about 1.0 mils thick. The resulting finish has excellent adhesion to the metal substrate and good intercoat adhesion and the finish is smooth and has good food release properties.

The fry pan is subjected to a series of cooking cycles and the finish continues to have excellent food release properties and good adhesion to the substrate.

EXAMPLE 3

A mill base is prepared as follows:

| | Parts By Weight |
|---|---|
| Aryloxysulfone copolymer (described in Example 1) | 41 |
| N-methyl pyrrolidone | 230 |
| Silicone resin (described in Example 1) | 4 |
| Carbon black pigment | 24 |
| Total | 299 |

The above ingredients are charged into a ball mill and ground for 10 hours to form a uniform dispersion.

A primer is prepared as follows:

| | Parts By Weight |
|---|---|
| Mill base (prepared above) | 47 |
| Aryloxysulfone copolymer solution (15% polymer solids in N-methyl pyrrolidone, the polymer is described in Example 1) | 28 |
| Polytetrafluoroethylene dispersion (prepared in Example 2) | 30 |

-continued

| | Parts By Weight |
|---|---|
| Total | 105 |

The above ingredients are thoroughly blended together and the composition is then filtered to form the primer having a pigment to binder ratio at about 10/100.

A topcoating composition then is prepared as follows:

Aryloxysulfone/silicone Resin Pigment Dispersion

| | Parts By Weight |
|---|---|
| Mill base (prepared above) | 37.5 |
| Aryloxysulfone copolymer solution (described above) | 200.0 |
| Silicone resin (described in Example 1) | 3.2 |
| Total | 240.7 |

The above ingredients are thoroughly blended together to form the dispersion.

Topcoating Composition

| | Parts By Weight |
|---|---|
| Aryloxysulfone/silicone resin pigment dispersion (prepared above) | 59.0 |
| Aryloxysulfone copolymer solution (described above) | 25.0 |
| Silicone Resin (described in Example 1) | 0.4 |
| Polytetrafluoroethylene dispersion (prepared in Example 2) | 94.0 |
| Total | 178.4 |

The primer is sprayed onto an aluminum substrate and onto an aluminum fry pan and prebaked at 220° C. for 10 minutes and to form a primer layer 0.5 mils thick that has excellent adhesion to the metal substrate. The topcoating composition then is sprayed over the primed aluminum substrate and frying pan and dried and baked at 390° C. for 20 minutes to give a finish 2.0 mils thick. The resulting finish has excellent adhesion to the metal and excellent intercoat adhesion, has a good appearance and has excellent food release properties. The fry pan is subjected to cooking cycles and the finish retains its excellent food release properties.

The invention claimed is:

1. A topcoating composition comprising 5–60% by weight, based on the weight of the total composition, of a binder; said binder consisting essentially of
   1. 33–43% by weight, based on the weight of the binder, of an aryloxysulfone copolymer of the formula:

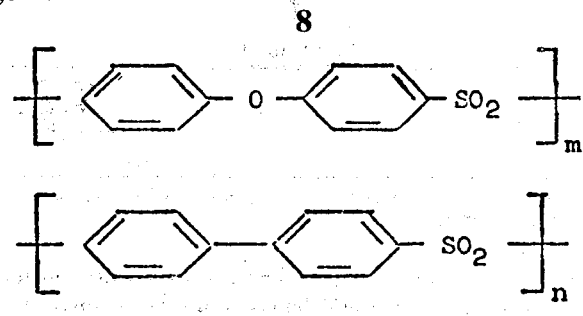

where $m$ and $n$ are positive integers from 15 to 2,500;

2. 52–62% by weight, based on the weight of the binder, of a uniformly dispersed perfluorocarbon polymer selected from the group consisting of polytetrafluoroethylene and a copolymer of tetrafluoroethylene and hexafluoropropylene, wherein the perfluorocarbon polymer has a particle size of about 0.01 to 6 microns in diameter; and
   3. 4–6% by weight, based on the weight of the binder, of a silicone resin of the formula:

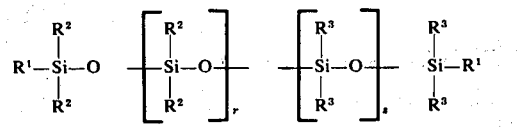

where $R^1$ is a monovalent radical selected from the group consisting of hydroxyl, hydrogen, and alkyl group having 1–8 carbon atoms, and an aryl group, $R^2$ and $R^3$ are monovalent radicals selected from the group consisting of hydrogen, an alkyl group having 1–8 carbon atoms and an aryl group, and where $r$ and $s$ are positive integers from 0 to 3000, wherein the sum of the components is not more than 100%; and 40–95%, by weight based on the weight of the total composition, of a solvent for the aryloxysulfone copolymer.

2. The coating composition of claim 1 wherein the weight ratio of tetrafluoroethylene to hexafluoropropylene of the copolymer is about 75/25 to about 85/15.

3. The coating composition of claim 1 wherein the binder consists essentially of:
   1. an aryloxysulfone copolymer wherein the ratio of $m$ to $n$ is from about 4:6 to 3:7; and
   2. a perfluorocarbon polymer selected from the group consisting of polytetrafluoroethylene and a copolymer of tetrafluoroethylene and hexafluoropropylene having a weight ratio of tetrafluoroethylene to hexafluoropropylene of about 95/5 to 50/50, and wherein the perfluorocarbon has a particle size of about 0.01–2 microns in diameter.

4. The coating composition of claim 1 wherein the silicone resin is selected from the group dimethyl polysiloxane, dimethyl diphenyl polysiloxane, a blend of dimethyl polysiloxane and diphenyl polysiloxane and hydroxyl terminated dimethyl diphenyl polysiloxane.

* * * * *